G. C. TAYLOR.
TREAD FOR TIRES, &c.
APPLICATION FILED JUNE 15, 1909.
1,043,373.
Patented Nov. 5, 1912.
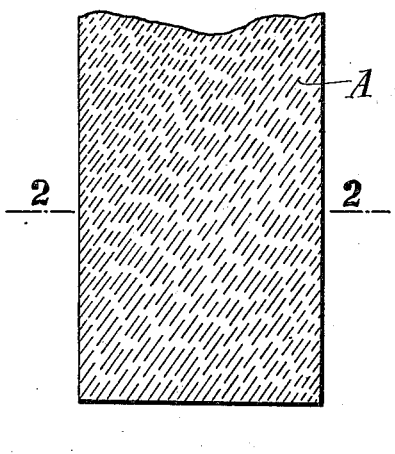
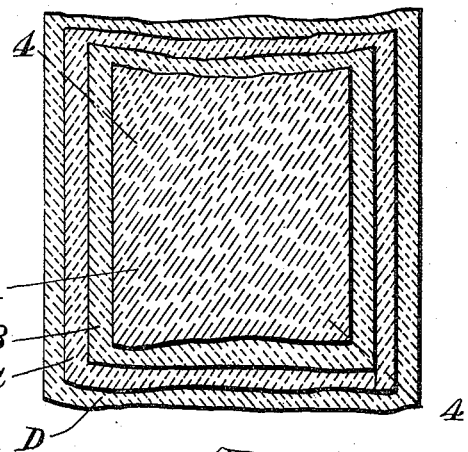
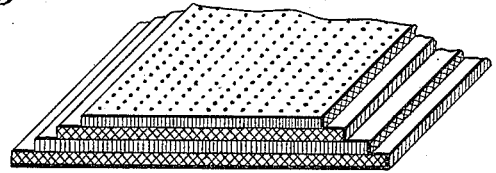
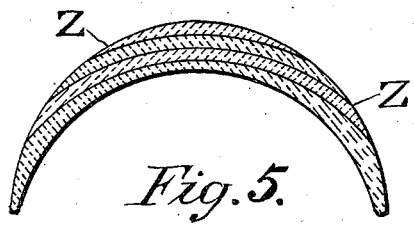
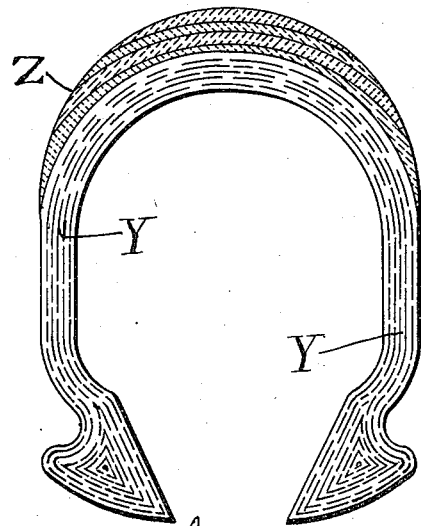
Inventor
George Crosland Taylor

UNITED STATES PATENT OFFICE.

GEORGE CROSLAND TAYLOR, OF HELSBY, ENGLAND.

TREAD FOR TIRES, &c.

1,043,373. Specification of Letters Patent. Patented Nov. 5, 1912.

Application filed June 15, 1909. Serial No. 502,217.

*To all whom it may concern:*

Be it known that I, GEORGE CROSLAND TAYLOR, gentleman, a subject of the King of Great Britain, residing at "Ravenscar," Helsby, Cheshire, England, have invented certain new and useful Improvements in Treads for Tires, &c., of which the following is a specification.

This invention relates to the manufacture of pneumatic tire covers and more particularly to the manufacture of treads for such covers and has for its objects to provide an improved tread for such covers, such treads according to the present invention comprising a plurality of thin layers formed of fabric on edge (which may advantageously be fabric known as bias fabric) and rubber with the said layers superimposed one on another and adhesively secured together with the lengthwise direction of the fabric in the said layers crossed (either in adjacent layers or otherwise) and the whole body of said layers compressed together to form the tread, the fabric elements extending transversely of the thickness of the layer.

Heretofore there has been proposed a method of manufacturing tread pieces for forming the treads of pneumatic cushion or other silent tires by placing flatwise together a plurality of layers of rubbered textile fabric such as canvas, then subjecting same to heavy pressure to thereby form a solid block (and also it has been proposed to embed fibers or threads in rubber or the like and then compress the same into a solid block) and next cutting up said block across the direction of the fabric (or threads) laid therein so as to form thick slabs or slices from such blocks, *i. e.*, slabs or slices of the desired thickness of the tread to be formed therewith, and then cutting these slabs or slices into individual tread pieces or so-called "lozenges" (each of the actual thickness of the tread) so that the edges of the fabric in said tread pieces or lozenges are presented to wear. Now, instead of cutting said blocks into thick slabs or slices of the actual thickness of the tread to be formed therefrom as aforesaid, according to the present invention I cut such blocks into thin slabs or slices or layers (with the edges of said fabric therein presented to wear) and I superimpose a plurality of these thin layers formed as aforesaid with the lengthwise direction of the fabric on edge disposed diagonally to the circumferential direction of the tread and I arrange these layers with the diagonal direction of the fabric on edge therein oppositely disposed in the various layers, advantageously crossed in each two adjacent layers, of the said plurality of layers; and I then apply pressure to this last-named plurality of thin layers to firmly compress same together to form the tread before applying the latter to the tire body or car-case of the tire; and treads thus formed in accordance with the present invention may be applied to, and secured in any suitable manner to, the tire body or carcase which latter may be of any known and suitable construction adapted to have said treads applied thereto. The effect of thus arranging and disposing these alternate layers with the edge-fabric (or threads) in opposite or crossed diagonal relation is practically to prevent puncture or render puncture of the air tube practically impossible; as in the event of a sharp point entering the tread the alternate diagonal disposition of the edge-fabric (or threads) in such layers will resist the point or turn same aside before such point can pass through the several layers; thus for example in the event of any point entering the outermost layer by forcing its way between the diagonally disposed edge-fabric (or threads) such sharp point will then meet the oppositely disposed edge-fabric (or threads) in the next layer, and the latter (owing to this formation of the tread) prevents further passage of the point; or, in extreme cases, if the point should force its way through the second layer it would be arrested by the third layer or subsequent layer.

In carrying out the present invention I find it advantageous to make the various layers of different widths; *e. g.* the outermost layer of narrowest width and each succeeding layer underneath same of an increased width.

Referring to the accompanying drawings:—Figure 1 is a plan view of part of a length of a layer (laid flat) of fabric on edge and rubber formed for example as described in the British Patent No. 12319 of 1908 and in the application for U. S. Patent filed 20th August, 1908, Serial Number 449446. Fig. 2 is cross sectional view on line 2—2 Fig. 1. Fig. 3 is a plan view of a plurality of such layers (laid flat) superimposed upon one another with the direction of the edge fabric in each said layer oppositely disposed to the next adjoining layer (and all said layers being of varying width) so as to form a laminated tread. Fig. 4 is a perspective view of a pile comprising several layers, the end of the pile showing the arrangement of the fibers in a section taken on line 4—4 of Fig. 5. Fig. 5 is another cross sectional view, of the laminated tread formed by the plurality of layers shown in Figs. 3 and 4, after same have been subjected to heavy pressure and shaped—under such pressure—into the form of the tread of the tire. Fig. 6 is a cross sectional view of a tire cover composed of a suitable form of tire body or carcase having arranged and mounted thereon the aforesaid laminated tread so as thus to form a complete tire cover.

I form thin layers (slabs, strips, or pieces) such as A, B, C, and D, (see Figs. 1 to 4) of fabric on edge and rubber with the edge-fabric lying diagonally or thereabout to the parallel side edges of said strips or layer; such strips or layers being advantageously formed in the manner and by the means as set forth in my aforesaid British Patent No. 12319 of 1908 and U. S. Patent application filed 20th August, 1908, Serial No. 449446—or same may be otherwise suitably formed; such strips or layers being of a suitable thickness say one eighth of an inch or thereabout, and if desired these strips may be of different widths transversely for the different layers of the tread as shown. In manufacturing this laminated tread, for example with four layers as illustrated, the strip for forming the bottom layer D of the tread has the next strip or layer C laid upon same (either with or without the addition of any solution or adhesive material between the adjoining faces of these two layers C and D) with the direction of the edge-fabric in the layer D oppositely disposed to the direction of the edge-fabric in the layer C, and said two layers C and D are then pressed together advantageously flatwise or in a flat position; and the said two layers are each made up of one or more pieces of sufficient length to form the total circumference of the tread for the tire cover to be made therefrom. The two further layers B and A are similarly pressed (flatwise) one at a time on to the two first layers D and C but with the diagonal direction of the edge-fabric (or threads) in each said layer at right angles to the diagonal direction of the edge-fabric in the next adjoining layer. For example, for a light tire, such as a bicycle tire or tri-car, two or at the most three such alternate layers will be sufficient; while in the case of an ordinary motor tire four or more may be used; and for very heavy tires then six or eight such layers may be employed—but I do not limit myself in any way to the number of layers which may be used as I may employ any number of such layers more than one. For the sake of clearly showing how my invention can be carried out I have illustrated and will describe the manufacture of a motor tire having four such layers A, B, C, and D; the outermost layer A of which is the narrowest transversely, and each of the three lower layers B, C, D, being wider in succession. Having placed these layers A, B, C, and D together in the aforesaid manner i. e. with the diagonal direction of the edge-fabric alternating in each layer as aforesaid, and having pressed same together (flatwise) as aforesaid, I next place the band thus made up of such plurality of layers in any suitable mold (not shown) for the purpose of applying pressure upon the inside or otherwise of such assemblage of layers A, B, C, D, to thus consolidate and force same into a solid tread as illustrated in Fig. 5; and in practice I have found it advantageous to insert in such mold this plurality of layers A, B, C, and D, of a total length circumferentially slightly in excess of the circumference of said mold i. e. slightly in excess of the circumference of the tread to be formed from said plurality of superimposed layers A, B, C, D; the object of this excess of length being to form a good joint where the ends of the layers meet, and generally to consolidate the whole tread. A coating of rubber may or may not be applied to the inside or outside (or both) of this band formed of such plurality of layers either before or after pressing same in the manner and by the means hereinbefore described or by otherwise pressing same. In this pressing operation the edges of some or all of the different layers of the tire may be left as they are; or they may be pressed down or rounded off or caused to disappear in the pressing operation as shown in Fig. 5 and results in the tread having a rounded and practically smooth curved surface Z (see Figs. 5 and 6) on the exterior i. e. curved to the transverse shape of the tread of the finished tire cover and the whole tread curved circumferentially to the circumferential curve of the tire cover. Next I take any suitable carcase or tire body such as Y (see Fig. 6) adapted to receive thereon and have applied thereto such tread as aforesaid; and I then secure said tread firmly onto said carcase or tire body Y as shown in Fig. 6 for example by pressing same together in any known or suitable manner. The tire, or tread portion alone, may be vulcanized or otherwise treated and finished in any desired or suitable manner.

By manufacturing pneumatic tire covers with the tread formed as aforesaid, the result is that in use not only do these treads resist or prevent puncture but as the tire wears away each layer in succession disappears and the next layer underneath then becomes the wearing surface and presents a fresh surface to wear; thus this tread itself automatically presents a succession of new unworn surfaces to wear.

What I claim is:—

1. In a tire, the combination of a plurality of thin layers formed of bias fabric on edge superposed one on another and adhesively secured together with the lengthwise direction of the fabric in the said layers crossed and compressed together to form the tread, the fabric elements extending transversely the thickness of the layer.

2. In a tire, the combination of a plurality of thin layers formed of bias fabric on edge superposed one on another and adhesively secured together with the lengthwise direction of the fabric in adjacent layers crossed and compressed together to form the tread, the fabric elements extending transversely the thickness of the layer.

3. In a tire, the combination of a plurality of thin layers formed of bias fabric on edge superposed one on another and adhesively secured together with the lengthwise direction of the fabric in said layers crossed and compressed together to form the tread, the fibers or elements of each of the strips of on edge fabric terminating at the surface of each layer, and the fabric elements extending transversely the thickness of the layer.

In witness whereof I have hereunto set my hand in the presence of two witnesses.

GEORGE CROSLAND TAYLOR.

Witnesses:
 LEWIS JOHNSTONE,
 H. WILLIAMS.

Copies of this patent may be obtained for five cents each, by addressing the "Commissioner of Patents, Washington, D. C."